Feb. 12, 1957 A. H. FREDRICK 2,781,495

DELAY LINE PHASE SHIFTER

Filed Jan. 15, 1946

INVENTOR
ARDEN H. FREDRICK

BY M. O. Hayes

ATTORNEY 2,781,495
Patented Feb. 12, 1957

2,781,495

DELAY LINE PHASE SHIFTER

Arden H. Fredrick, Boston, Mass., assignor to the United States of America as represented by the Secretary of the Navy Application January 15, 1946, Serial No. 641,339

6 Claims. (Cl. 333—31)

This invention in general relates to delay lines and more specifically to variable length delay lines for use in phase shifting.

In certain radar range circuits the range time interval is produced by an oscillator. It is desirable to provide some means to shift the phase of the range oscillation continuously to position the range marks. There are several methods of phase shifting in common use including RC and RL circuits. However, it is difficult to obtain any appreciable output in the desired frequency range with existing methods of phase shifting.

It is an object of my invention to provide a variable delay line capable of shifting the phase of an applied signal through a complete cycle.

A further object of my invention is to provide a means of continuously varying the length of said delay line continuously to vary the phase of an applied signal to produce an output signal substantially the same in amplitude but shifted in phase.

To accomplish the foregoing general objects, and more specific objects which hereinafter appear, my invention resides in the circuit elements and their relation to one another, as are more particularly described in the following specification. The specification is accompanied by drawings, in which.

A transmission line may be made up of long straight wires or equivalent lumped capacitors and inductances. Consider a transmission line made up of two very long straight, parallel, cylindrical conductors. When current flows in the conductors, they will be surrounded by a magnetic field the strength of which will be proportional to the current. The line thus has series inductance. When there is an electric potential difference between conductors, there will be an electric field between them and thus charges on the lines. The line thus has shunt capacitance in addition to series inductance.

A coil wound in a cylindrical form will have a certain inductance. If the same coil is wound on a core with a conducting surface, there will be a shunt capacitance between the coil and the conducting surface. Thus by winding a coil with a certain inductance (L) on a form to get a desired shunt capacitance (C) so that the product LC is equal to the desired delay. It is possible to make up a delay line with any desired electrical length. The delay line so constructed could be made in a toroidal or cylindrical form.

The delay lines disclosed in this invention are constructed in the manner described above. A coil of fine copper wire which has been covered with an insulating material is wound tightly on an insulating core made of Bakelite or the like. This insulating core is painted with silver paint and then is plated with copper to give it a thin conducting surface. The coil is so constructed that it has a delay of a predetermined time. A line having a delay of 12.2 $\mu$ sec. is the desired length for the present example. As was stated previously, this coil might be wound in toroidal or cylindrical form and of any desired length.

Figure 1:
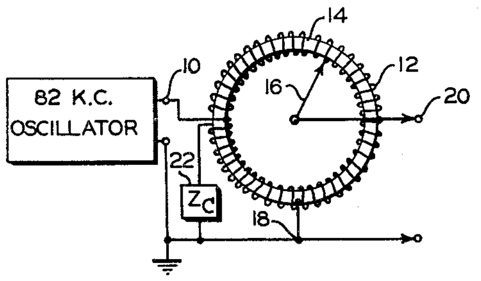
Fig. 1 is a diagram of one form of my invention.

A toroidally wound delay line 12 is shown in Fig. 1. The input signal is applied between points 10 and 18 and the output signal is taken off between the contact 16 and point 18. The end of the line is terminated in its characteristic impedance 22 to prevent reflections. The line length of 12.2 $\mu$ sec. is equivalent to a radar range of 2,000 yards. The line is used to shift the phase of an 82 kc. crystal oscillator in a range circuit. The crystal oscillator provides 12.2 $\mu$ sec. intervals. Thus, by varying the length of line 12 from 0 to 12.2 $\mu$ sec. any degree of phase shift may be obtained in the output from the 82 kc. crystal oscillator. In this way, the range marks may be shifted over the one mile range of the delay line.

Figures 3, 4:
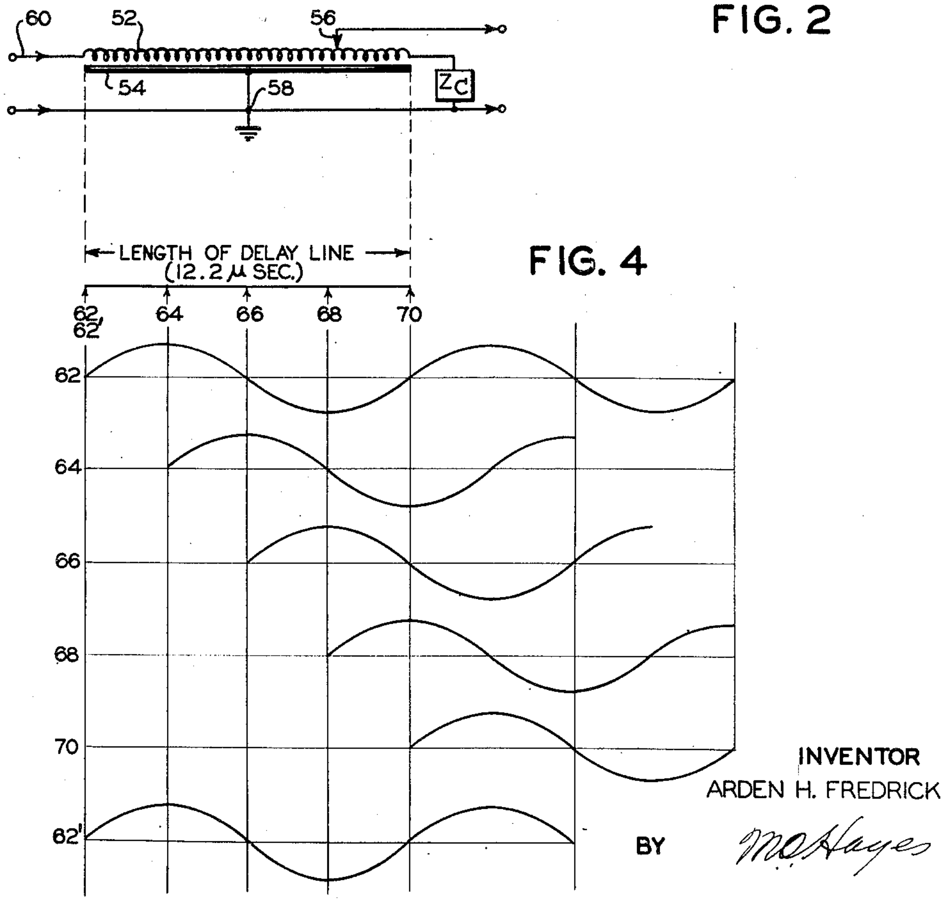
Fig. 3 is a schematic diagram of the delay lines shown in Figs. 1 and 2.
Fig. 4 is a sketch of the voltage at the various indicated points along the delay line.

A means of varying the length of the line is shown in Fig. 1. A movable arm 16 which can rotate and successively make contact with each turn of the coil 12 is used to change the length of line 12 and take off the output at the contact point on a delay line 12. The output is fed into a relatively high impedance load so that reflections on the line are negligible. As contact 16 is moved further from the input at 10 the length of the line 12 is increased so that the delay is increased. This is indicated schematically in Fig. 3 where line 52 represents the delay line 12. Plate 54 represents the conducting surface of the core 14 and 56 represents the movable tap 16. It can be more readily seen here that as tap 56 is moved away from the input 60, the length of the line increases and the phase is shifted as shown in Fig. 4 where 62, 64, 66, 68 and 70 indicate different positions of the movable contact 16 in Fig. 1 along the delay line. The waveforms are numbered to correspond to the wave at the position with the same number on the delay line. Waveform 62 is the same as the applied wave since the line will be out of the circuit at that point. As the moving contact moves out on the line, the delay will increase until at the end of the line a one cycle lag will be introduced as indicated at 70 which effectively puts the output signal back in phase with the applied signal. The coil 12 is wound so that as the last turn is passed over the first turn will come under contact 16 so the phase shift will be continuous.

Figure 2:
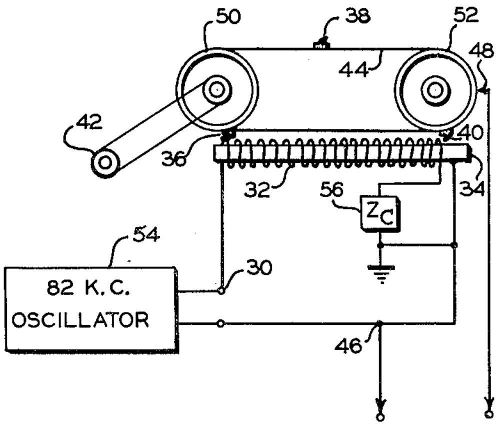
Fig. 2 is a diagram of another form of my invention.

The delay line shown in Fig. 2 is a similar one to the one in Fig. 1. It is wound in cylindrical form rather than toroidal form and a different method of varying the length of line is employed. The line 32 is wound on a core 34 which has a conducting surface. The signal from the oscillator 54 is applied between points 30 and 46.

The movable contact for this delay line actually consists of three contacts 36, 38, and 40 mounted on an endless chain or belt 44 which is made of an electrical conducting material. This chain or belt 44 passes over rollers 50 and 52. Roller 50 is turned by a crank 42 to move the contacts 36, 38 and 40 over the delay line 32 one after the other so one of the contacts is always on the line 32. Contact 48 is placed so that it continuously makes contact with the belt 44 so it is always effectively tied to the delay line 32 through whichever contact 36, 38 or 40 is in contact with line 32. The line 32 is terminated in its characteristic impedance 56 and the output is taken off at point 48 and fed to a relatively high impedance load so that reflections on the line will be negligible.

Fig. 3 may also be used as a schematic representation of the delay line of Fig. 2 in which the delay line 52 Fig. 2 corresponds to line 32, plate 54 is equivalent to the core with the conducting surface 34. Point 58 corresponds to the point 46 in Fig. 2, input terminal 60 is the same as terminal 30 and the output tap 56 represents the making contact 36, 38 or 40.

In describing the operation now reference will be made to Figs. 2 and 4. Assume that contact 36 is at the start of the delay line 32. The waveform which will be obtained at this point will be the same as the one indicated at 62 in Fig. 4. As crank 42 is turned, contact 36 will move along the line 32 and the phase of the wave will shift as the length of the line increases as shown at points 64, 66, 68 and 70 in Fig. 4, because of the time it takes the wave to travel along the line. When contact 36 reaches the end of the line at point 70 contact 38 will just make contact at the beginning of the line at point 62. At position 70, a phase shift of one wavelength is obtained which effectively puts the output here back in phase with the applied wave as indicated at 70. Thus as contact 38 is made just before contact 36 passes off the line, there is no interruption in the output and the phase shift can be maintained continuously as indicated at 62'. In like manner, contact 40 will make just before contact 38 breaks off and so on around the cycle so that a continuous phase shift is obtained.

It should be borne in mind that although my invention is described in conjunction with an 82 kc. oscillator for use in a range circuit this need not necessarily be the case. The phase of any applied signal which the delay line will pass could be shifted by the use of my invention.

It is believed that the construction and operation as well as the advantages of my improved phase shifting circuits will be apparent from the foregoing detailed description thereof. It will also be apparent that while I have shown and described my invention in a preferred form, changes may be made in the circuits disclosed without departing from the spirit of the invention as sought to be defined in the following claims.

What is claimed is:

1. Apparatus for providing an output elctrical signal shifted in phase with respect to an input electrical signal comprising a linear delay line including a uniform electrical winding, a plurality of movable contacts engageable with said uniform winding, said movable contacts being electrically connected, said contacts being secured to an endless belt and spaced thereon whereby one of said contacts engages said winding as another of said contacts is disengaged from said winding.

2. A delay line comprising an insulated wire coil wound on a core of nonconducting material, said core having a conducting surface, means for applying a signal to said delay line, means for terminating said delay line in its characteristic impedance, and means movable over said wire coil and in electrical contact therewith for extracting a signal from said delay line, said movable means passing into contact with a first end of said wire coil as it is moved out of contact with a second end of said wire coil.

3. A delay line comprising an insulated wire coil wound on a core of nonconducting material, said core having a conducting surface, means for applying a signal between one end of said coil and said conducting surface of said core, means connected between a second end of said coil and said conducting surface of said core, said last-mentioned means terminating said delay line in its characteristic impedance, means movable over said wire coil and in sliding electrical contact therewith for extracting a signal from said delay line, said movable means passing into contact with said first end of said wire coil as it is moved out of contact with said second end of said wire coil.

4. A delay line phase shifter comprising an insulated wire coil wound on a core of nonconducting material, said core having a conductive surface, means for applying a periodic signal between one end of said coil and said conducting surface of said core, means connected between a second end of said coil and said conducting surface of said core, said last-mentioned means terminating said delay line in its characteristic impedance, said delay line having a delay measured between said first and said second ends of said coil equal to the period of said periodic signal, and means movable over said wire coil and in sliding electrical contact therewith for extracting a signal from said delay line, said movable means passing into contact with a first end of said wire coil as it is moved out of contact with a second end of said wire coil.

5. A delay line phase shifter comprising an insulated wire coil wound on a core of nonconducting material, said core having a conductive surface, means for applying a periodic signal between one end of said coil and said conductive surface of said core, means connected between a second end of said coil and said conductive surface of said core, said last-mentioned means terminating said delay line in its characteristic impedance, said delay line having a delay time measured between said first and said second ends of said coil equal to the period of said periodic signal, and contact means continuously movable over the length of said coil for extracting a signal from said delay line, said movable means when moved in one direction passing into contact with said first end of said coil as it is moved out of contact with said second end of said coil.

6. A delay line phase shifter comprising an insulated wire coil wound on a cylindrical core of nonconducting material, said core having a conductive surface, means for applying a periodic signal to be phase shifted between one end of said coil and said conductive surface of said core, means connected between a second end of said coil and said conductive surface of said core, said last-mentioned means terminating said delay line in its characteristic impedance, said delay line having a delay measured between said first and second ends of said coil equal to the period of said periodic signal, a plurality of movable contacts engagable with said coil, each of said movable contacts being electrically connected to the other said contacts, said contacts being secured to an endless belt and spaced thereon such that one of said contacts engages said winding as another of said contacts is disengaged from said winding as said belt is moved.

References Cited in the file of this patent

UNITED STATES PATENTS

| | | |
|---|---|---|
| 1,466,293 | Brooks | Aug. 28, 1923 |
| 2,247,941 | Crosby | July 1, 1941 |
| 2,362,470 | De Rosa | Nov. 14, 1944 |
| 2,413,607 | Di Toro | Dec. 31, 1946 |
| 2,413,608 | Di Toro | Dec. 31, 1946 |
| 2,413,609 | Wheeler | Dec. 31, 1946 |
| 2,467,857 | Rubel et al. | Apr. 19, 1949 |